Feb. 21, 1961     I. PASTORELLO     2,972,168
MIXING AND THICKENING MACHINE FOR EXTRUSION
Filed Nov. 6, 1957     2 Sheets-Sheet 2

INVENTOR
IGNAZIO PASTORELLO
BY Irwin S. Thompson
ATTORNEY

2,972,168
MIXING AND THICKENING MACHINE FOR EXTRUSION

Ignazio Pastorello, Via Breda 118, Milan, Italy

Filed Nov. 6, 1957, Ser. No. 694,873

Claims priority, application Italy Nov. 21, 1956

6 Claims. (Cl. 18—2)

The object of the present invention is a mixing and thickening machine to extrude and granulate which is especially used in the industry of the plastic materials, in the chemical industry in general and in the industry of ceramics substantially constituted by: a large casing with an annular space for the heating or cooling, a first shaft crossing longitudinally said casing which shaft is connected to a motor. Said shaft is substantially a conveying screw or worm which starts where the shaft is fixed to the wall of the casing, comes out of the opposite wall and ends with an extruding head. The worm is closed in a cylindrical shell which is coaxial with it and is provided with an annular space provided for the heating and cooling, said shell being overhanging from the respective end-wall of the casing. Said first shaft drives by means of a suitable sleeve a second tubular shaft that is coaxial with the fixed shell surrounding the worm, the shell being the support for said second shaft. The shell as well as the second tubular shaft are provided near one end-wall with parts or inlet openings which allow the gradual introduction of the material contained in the casing. The second tubular shaft is externally provided with mixing elements or shovels.

Up to now to mix and extrude substances it was customary to use separated machines each of which had the precise scope of mixing or extruding. This required additional work to transport the material from one machine to the other and caused many economical and material disadvantages. The machine according to the present invention eliminates the above mentioned drawbacks as it comprises in the same apparatus devices for the mixing and the extruding processes and furthermore it improves the thermal efficiency of the working process, realizes a saving of fuel and allows to work at the most suitable temperature to obtain the best quality of extruded product.

Figure 1:
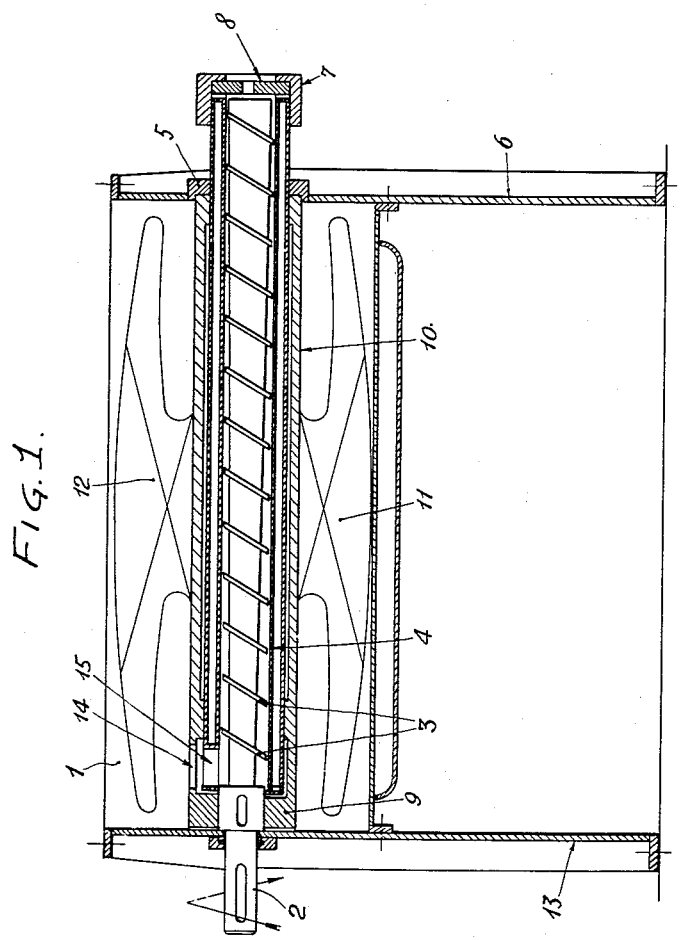
Figure 2:
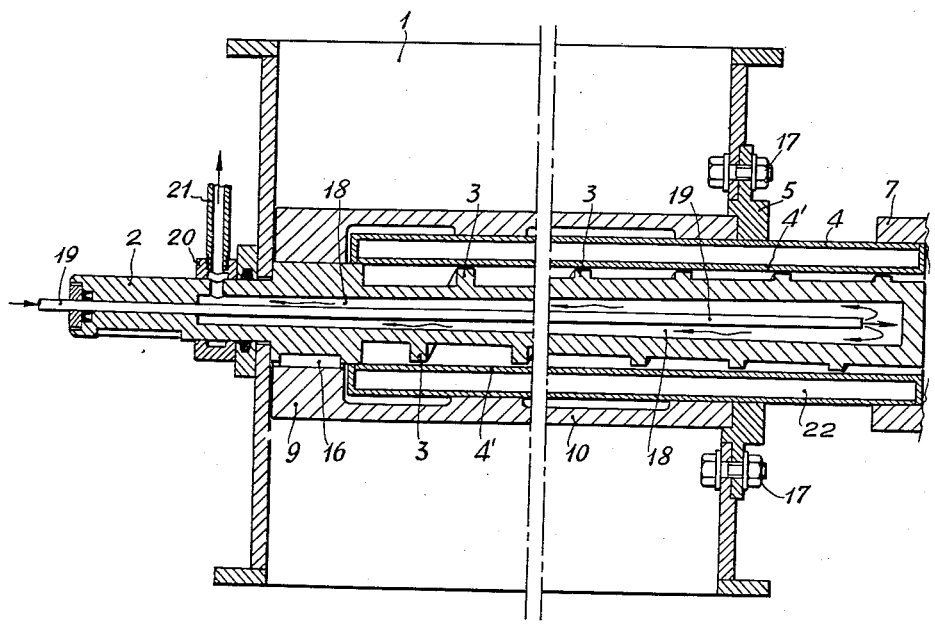

In the accompanying drawings, there is illustrated an exemplary form of apparatus embodying the present invention, and wherein Fig. 1 is an axial longitudinal sectional view of an apparatus according to the invention; and Fig. 2 is a view of Fig. 1 with parts cut away to show structure.

The machine comprises a casing 1 with an annular space for the heating or cooling which is longitudinally crossed by a central shaft 2 generally connected to a motor by means of a reducing gear or speed variator (not indicated in the drawing). On the shaft 2 is mounted a simple or multiple thread worm 3 having constant or variable pitch and depth of thread, the worm being surrounded by a cylindrical shell 4 provided with an annular space for the heating or cooling and fixed to the lateral wall of the casing by means of the flange 5 and the respective bolts. Upon having crossed the wall 6 of the casing the worm 3 ends with the extrusion head 7 provided with the disc 8. The annular space comprised between the worm 3 and the shell 4 preferably decreases in thickness as it extends from the inlet and to the outlet so that the compression and the thickening of the material may increase. The shaft 2 drives by means of a sleeve 9 through a key 16 a tubular shaft 10 coaxial with the shell 4 containing the worm. The shaft 10 is hence driven by the shaft 2 and is supported by the shell 4. The shell 4 and the shaft 10 are provided near the wall 13 of the casing with ports or inlet apenings 14 and 15 placed one on top of the other. Through said openings 14 and 15 the material contained in the casing is introduced in to the annular space comprised between the worm 3 and the shell 4 and proceeds toward the extrusion head 7. On the tubular shaft 10 are externally mounted some helicoidal elements or shovels 11, 12 which are suited to intimately mix and amalgamate the materials introduced in the fixing casing 1. The form of said shovels is such that the action of the mixing is effectively performed both when the shaft 10 rotates in the direction opposite to the one which provides the advancement of the material in the annular space comprised between the worm 3 and the relative external shell 4, that is when the worm 3 does not cause the advancement of the material and therefore there is no extrusion whatsoever through the head 7 and the disc 8, and also when the shaft 10 rotates in the same direction as the worm 3 during the extrusion phase.

Fig. 2 shows a heat exchange means mounted in the interior of worm 3. The cylindrical tubular shell 4 and the shaft 10 are journalled in a flange 5 which is secured to side wall 6 by bolts 17. The cylindrical shell 4 is provided with an annular space 22 for maintaining heating or cooling at a substantially uniform rate. The interior of worm 3 is hollow, as indicated by 18, and is provided with the coaxial tube 19 for the introduction of a cooling and heating liquid. The liquid is collected by a collector 20 in communication with hollow 18, and a pipe 21 is secured therein. Coaxial tube 19 could also be an electrical resistance provided with a source of electrical energy and used as a heat exchange means.

The operation takes place in the following manner:

Once the powdered and liquid substances to be mixed, thickened and extruded are introduced in the casing 1 (particularly vinylic, phenolic, urea-resins with their relative stabilizer, lubricants, etc.), they are intimately mixed by the shovels 11 and 12 which rotate in the direction of rotation opposite to the one causing extrusion so that only a mixing action is performed.

When the direction of rotation of the shaft 2 is reversed, the already mixed powders come through the openings 14 and 15 into the annular chamber or space comprised between the worm 3 and the shell 4 as the mixed powders are brought in by the rotation of the shaft and are axially displaced toward the extrusion head 7 and the outlet disc 8.

The shaft 10 moves with screw 3, through a key shown on the drawing near the sleeve 9, and thus said shaft always rotates with the screw in the same direction, that is, if screw 3 rotates clockwise, the shaft 10 will rotate clockwise, and if screw 3 rotates counterclockwise, the shaft 10 will rotate counterclockwise. Now when the screw 3 and the shaft 10 rotate counterclockwise, the material is not carried by the screw, that is, we have no advancement, but the helical elements or shovels 11—12 exert their mixing effect upon the material introduced. On the contrary, when the screw 3 and shaft 10 rotate clockwise, they force the material to advance and this advancement of the material brings about its extrusion, and the helical elements 11—12 always exert their mixing effect upon the material introduced.

The material enters the shell 4 only when the openings 14 and 15 are aligned, that is, it enters by gravity and at intervals. When casing 1 is wide, the material enters in opening 14—15 because it is carried upwardly by shovels 11—12. Even when the material enters at intervals, this does not bring about any inconvenience, as tests have always proved, since the material is gradually compressed.

The shaft 2 may be internally provided with holes placed along its whole length so as to allow the circulation of heating or cooling fluids or the introduction of electrical resistances to control the thermal conditions in the annular space between the worm 3 and the shell 4.

The openings 14 and 15 may be protected by fixed or rotating grids or may be provided with spirals which convey the powders towards the same inlet openings.

The shell 4 may either be fixed or rotate in the same or in the opposite direction of rotation as the shaft 2 and may be internally provided with knurlings or any suitable means.

In another embodiment of the invention, the shaft 2 may drive the shaft 10 in the opposite direction through a gear drive.

What I claim is:

1. Mixing and thickening machine for granulating and extruding plastic material comprising a fixed casing having a hollow space, a first rotatable longitudinal shaft axially crossing said casing and protruding out of it, said shaft connected at one of its ends with a motor and provided at its other end with an extrusion head, a second tubular shaft coaxial, external and secured to said first shaft, a worm secured to said first shaft extending from inside said casing to said extrusion head, a tubular fixed shell coaxial with said worm and mounted internally of said second shaft, said shell extending from inside the casing to the protruding end of said worm where said extrusion head is mounted while the top part of the opposite end of said shell has an opening therein, said second shaft having mixing elements carried thereon and provided with an opening corresponding with the opening of said shell whereby upon rotation of said first and second shafts in one direction, the material is mixed, and upon rotation of said first and second shafts in the opposite direction, the material enters the openings of the second shaft and shell under the action of the mixing elements when the openings are in coincidence whereupon under the action of the worm the material is moved along and extruded by a perforated disc mounted in the extrusion head.

2. Machine according to claim 1 in which the tubular shell is connected to a wall of the casing by means of a flange and bolts.

3. Machine according to claim 1 in which the worm is internally hollow so as to contain a heat exchange means.

4. Machine according to claim 3 in which said heat exchange means includes a tube mounted coaxially within said worm for admission of a heat exchange medium.

5. Machine according to claim 3 in which said heat exchange means comprises electrical resistance means.

6. A mixing and thickening machine for extruding and granulating plastic material comprising a fixed casing, a motor-operated first shaft within the casing and having one end protruding from one side of the casing, a feeding screw operatively connected with said first shaft and provided at one of its ends with an extrusion head, a second shaft concentric to said first shaft and secured thereto, and helicoidal mixing shovels mounted on said second shaft to form a single unit coaxial with and surrounding said screw whereby upon rotation of said first shaft and unit in one direction, the material is mixed, and upon rotation of said first shaft and unit in the opposite direction, the material is extruded.

References Cited in the file of this patent

UNITED STATES PATENTS

| | | |
|---|---|---|
| 2,369,359 | MacWilliam et al. | Feb. 13, 1945 |
| 2,547,000 | Gray | Apr. 3, 1951 |
| 2,704,380 | Cuzzi | Mar. 22, 1955 |
| 2,797,070 | Winn et al. | June 25, 1957 |